United States Patent
Loscher (10) Patent No.: US 12,319,376 B2
(45) Date of Patent: Jun. 3, 2025

(54) MOUNT FOR A HANDHELD ELECTRONIC DEVICE

(71) Applicant: ANNEX PRODUCTS PTY. LTD., South Yarra (AU)

(72) Inventor: Martin Loscher, South Yarra (AU)

(73) Assignee: ANNEX PRODUCTS PTY. LTD., South Yarra (AU)

( * ) Notice: Subject to any disclaimer, the term of this patent is extended or adjusted under 35 U.S.C. 154(b) by 237 days.

(21) Appl. No.: 18/298,911

(22) Filed: Apr. 11, 2023

(65) Prior Publication Data
US 2024/0343331 A1 Oct. 17, 2024

(51) Int. Cl.
*B62J 11/00* (2020.01)
*B62J 50/21* (2020.01)

(52) U.S. Cl.
CPC .............. *B62J 11/00* (2013.01); *B62J 50/225* (2020.02)

(58) Field of Classification Search
CPC ................................. B62J 11/00; B62J 50/225
USPC ....................................... 224/420; 248/228.3
See application file for complete search history.

(56) References Cited

U.S. PATENT DOCUMENTS

| 7,891,618 | B2 * | 2/2011 | Carnevali .......... A47B 21/0314 248/228.6 |
| 8,608,120 | B2 * | 12/2013 | Chen ..................... F16M 11/14 403/56 |
| D873,812 | S * | 1/2020 | Peters .......................... D14/452 |
| 10,569,717 | B2 * | 2/2020 | Peters .................... B62J 50/225 |
| RE50,098 | E * | 8/2024 | Peters .................. F16M 11/041 |
| 12,179,875 | B2 * | 12/2024 | Van Houten ............. B62J 11/00 |

FOREIGN PATENT DOCUMENTS

DE 102022134166 B3 * 3/2024

OTHER PUBLICATIONS

Lampa, "Titan Brake, brake fluid reservoir cover mount," accessed on the Internet at: https://www.lampa.it/en/articles/91596-titan-brake-brake-fluid-reservoir-cover-mount!gr=6-83-53-0 . . . (believed to be publicly available before Mar. 10, 2023).
SP Connect, "Brake Mount," accessed on the Internet at: https://sp-connect.com/collections/mounts/products/brake-mount (believed to be publicly available before Mar. 10, 2023).

* cited by examiner

*Primary Examiner* — Justin M Larson
(74) *Attorney, Agent, or Firm* — Barnes & Thornburg LLP (57) ABSTRACT

A mount for coupling a handheld electronic device to a brake reservoir assembly of a motorcycle. The mount includes a mount body securable to the handheld electronic device and a pair of brackets slidably engageable with the mount body and slidably engageable with each other during assembly of the mount.

20 Claims, 7 Drawing Sheets

MOUNT FOR A HANDHELD ELECTRONIC DEVICE

BACKGROUND

The present disclosure relates to a mount for a handheld electronic device. More particularly, the present disclosure relates to a mount for mounting a handheld electronic device to a brake reservoir assembly of a vehicle such as a motorcycle.

SUMMARY

A mount for coupling a handheld electronic device to a brake reservoir assembly of a motorcycle in accordance with the present disclosure includes a mount body and a pair of brackets. The mount comprises a mount body securable to the handheld electronic device. The mount body includes a pivot arm pivotable in at least one direction for adjusting the positioning of the handheld electronic device. The pair of brackets are slidably engageable with the mount body and slidably engageable with each other during assembly of the mount. The brackets are securable to the brake reservoir assembly by a pair of fasteners. Each bracket has a pair of arms extending parallel to each other and a C-shaped end portion. Each pair of arms defines a slot for receivably engaging the mount body. Each C-shaped end portion includes a bottom tab defining an aperture for receiving a respective fastener extending through a respective slot for securing a respective bracket to the brake reservoir assembly. Each C-shaped end portion defines an open face, the open faces facing each other when the brackets are engaged with each other.

The mount body may include a mount body fastener and a base having a base cap, a stud plate having a column defining a column hole, and a cover defining a cover hole. The base cap and stud plate may be disposed on a bottom side of the pair of brackets and the cover disposed on a top side of the pair of brackets when the brackets are engaged with each other. The column extends through the slots defined by the pairs of arms and into the cover hole, the mount body fastener extending through the cover hole and into the column hole for securing the mount body to the pair of brackets.

The mount body fastener may be coupled to the pivot arm and may secures the pivot arm to the brackets. The base cap may include a pair of latching arms and the cover may include a pair of latch tabs engaged with the latching arms, the latching arms extending around the pair of brackets. The brackets have a length when engaged and the length may be adjustable between an extended length to a collapsed length. Each arm of each bracket may include a stop at an end distal from the C-shaped portion of the arm and the cover includes a plurality of stop tabs, the stops engaging the stop tabs when the brackets are extended to the expanded size to prevent the brackets from separating from each other during engagement of the brackets and mount body.

The mount body further may include a handheld electronic device mount having an interface securable to the handheld electronic device. The mount body may further include a pair of pivot pins associated with the pivot arm.

The mount body may further include a pivot spacer engaged with the pivot arm and a top side of the cover, the pivot spacer defining a pivot spacer hole for receiving the mount body fastener, the pivot spacer including a first plurality of teeth and the cover including a second plurality of teeth engageable and selectively positionable with the first plurality of teeth to permit selective rotational positioning of the pivot spacer relative to the cover during adjustment of the mount. The mount body may include a pivot spacer engaged with the pivot arm, the pivot arm including a first plurality of teeth and the pivot spacer including a second plurality teeth engageable and selectively positionable with the first plurality of teeth to permit selective pivotal positioning of the pivot arm relative to the pivot spacer during adjustment of the mount. The mount body may include a head spacer engaged with the pivot arm, and a head engaged with the head spacer and the handheld electronic device mount, the pivot arm includes a first plurality of teeth and the pivot spacer includes a second plurality of teeth engageable and selectively positionable with the first plurality of teeth to permit and selective pivotal positioning of the pivot arm relative to the head spacer during adjustment of the mount. The mount body may include a head coupled to the pivot arm and engaged with the handheld electronic device mount, the head includes a first plurality of teeth and the handheld electronic device mount includes a second plurality of teeth engageable and selectively positionable with the first plurality of teeth to permit selective rotational positioning of the head relative to the handheld electronic device mount during adjustment of the mount.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures, and like reference characters designate the same or similar parts throughout the figures, of which.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

Figure 1A:
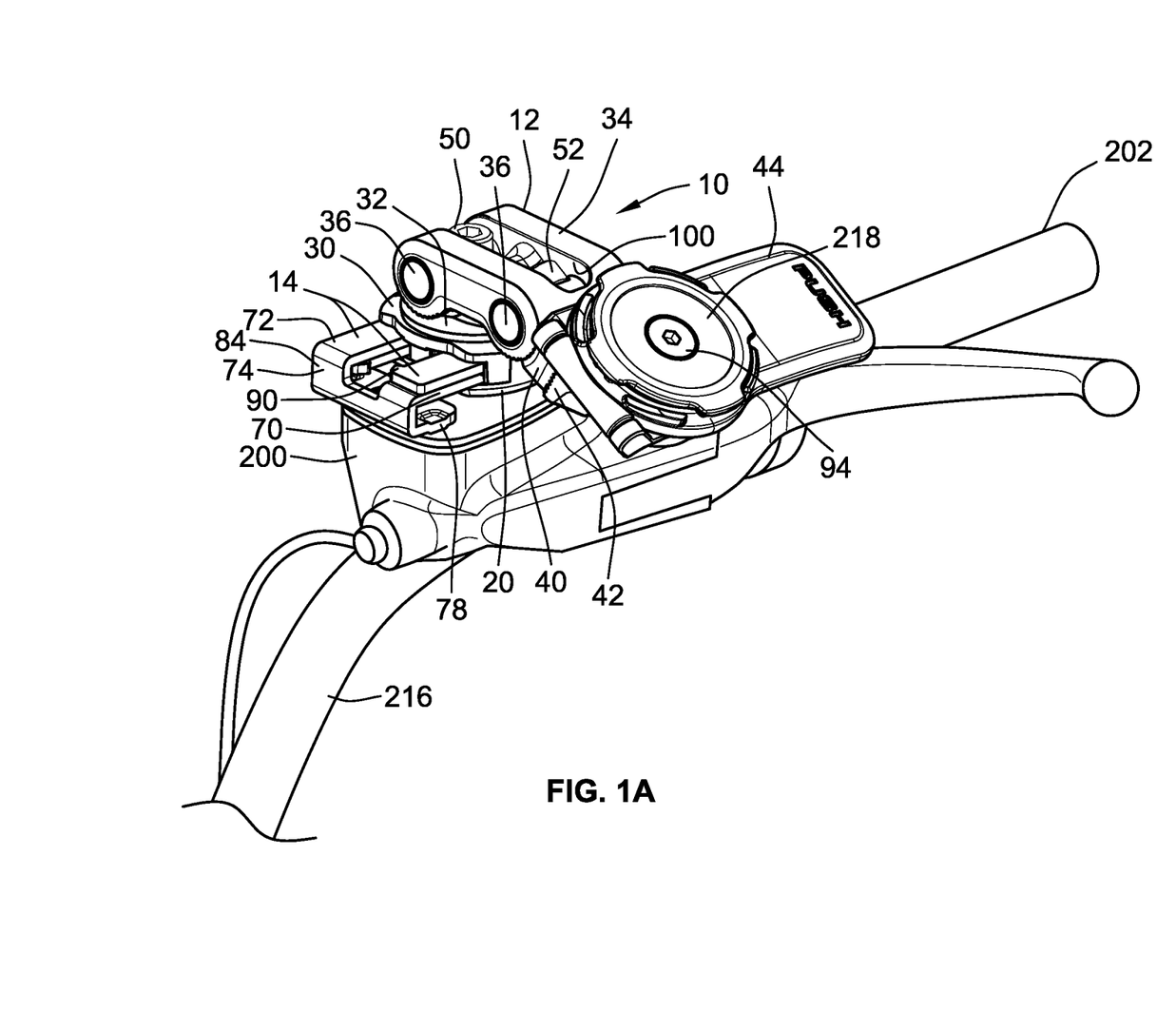
FIG. 1A is a partial perspective view of a motorcycle and a mount in accordance with an embodiment of the present disclosure secured to a brake reservoir assembly of the motorcycle.
Figure 1B:
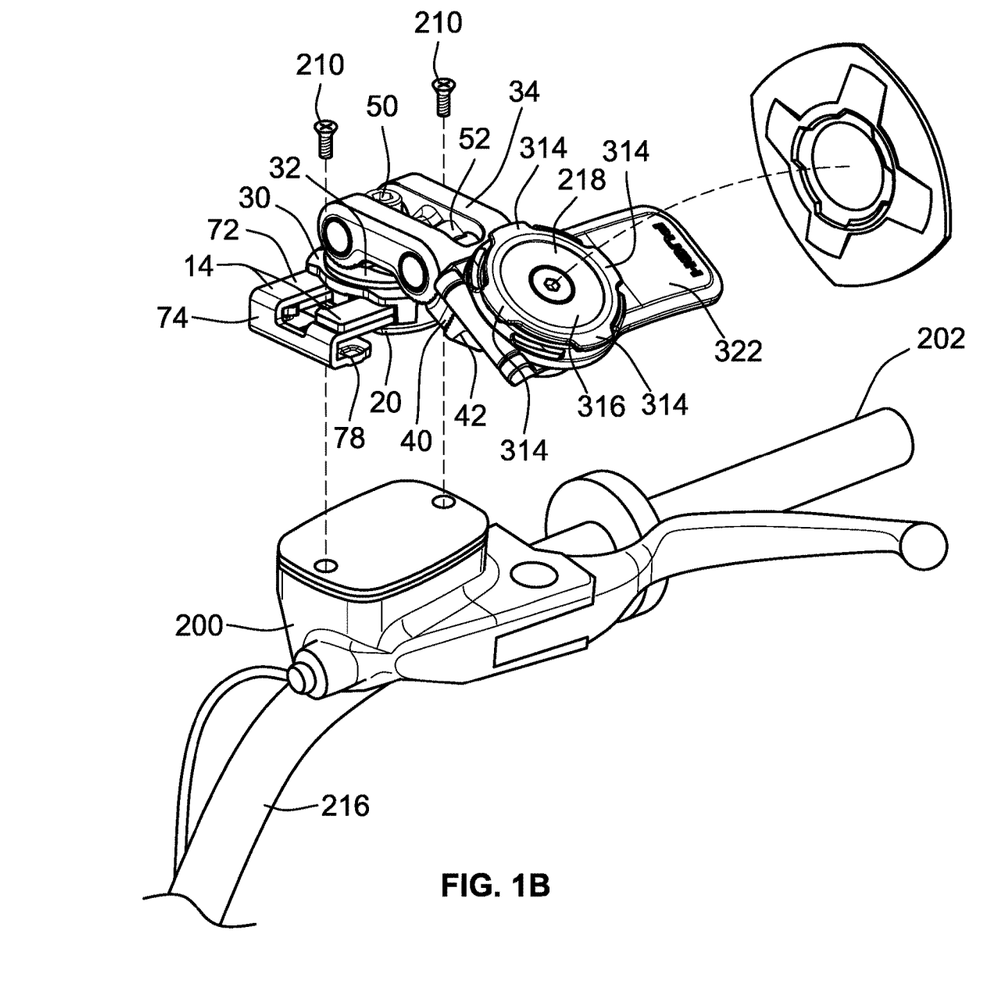
FIG. 1B is a partial perspective and partial exploded view of the motorcycle and mount of FIG. 1.
Figure 2:
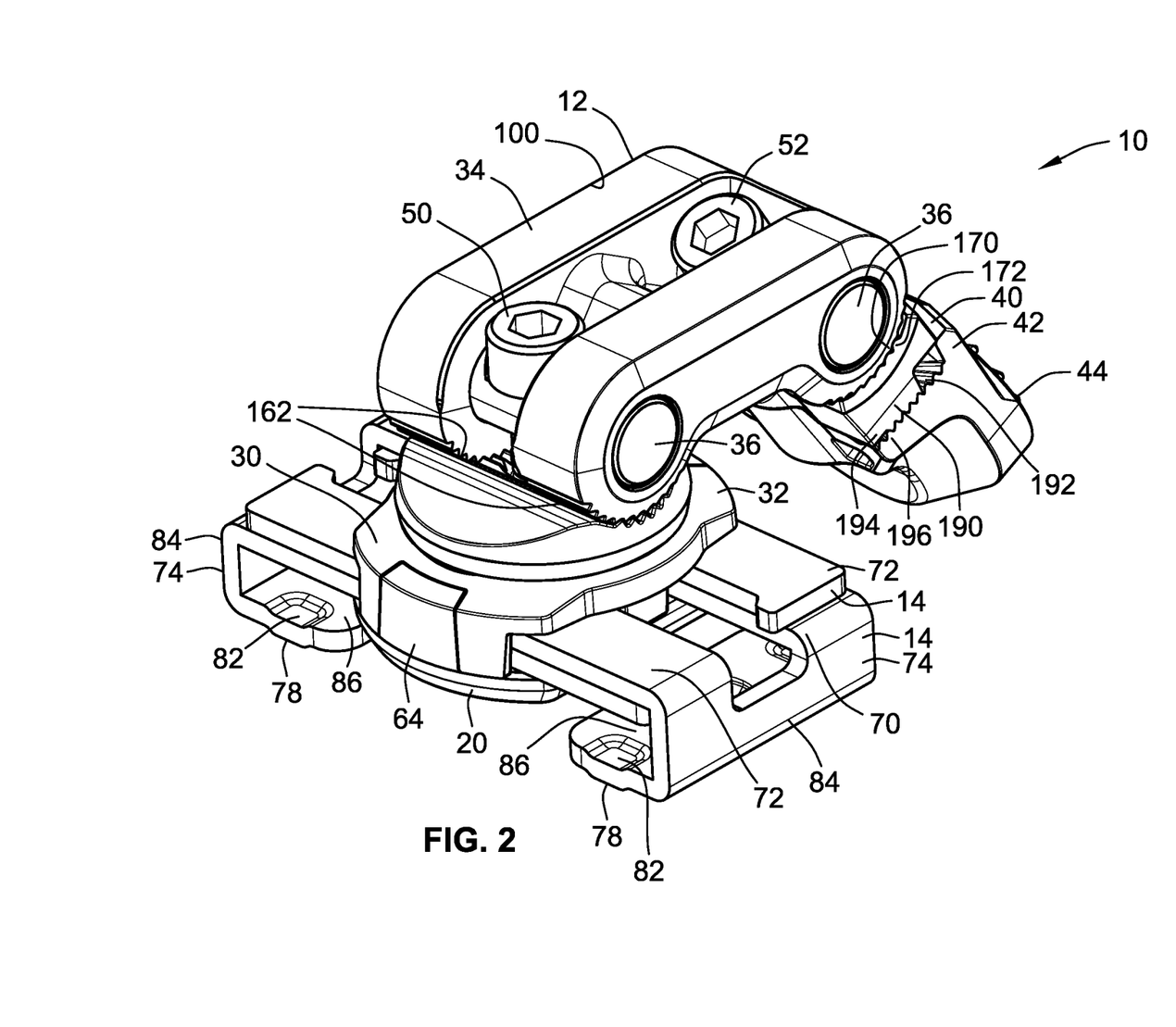
FIG. 2 is a perspective view of the mount of FIG. 1.
Figure 3:
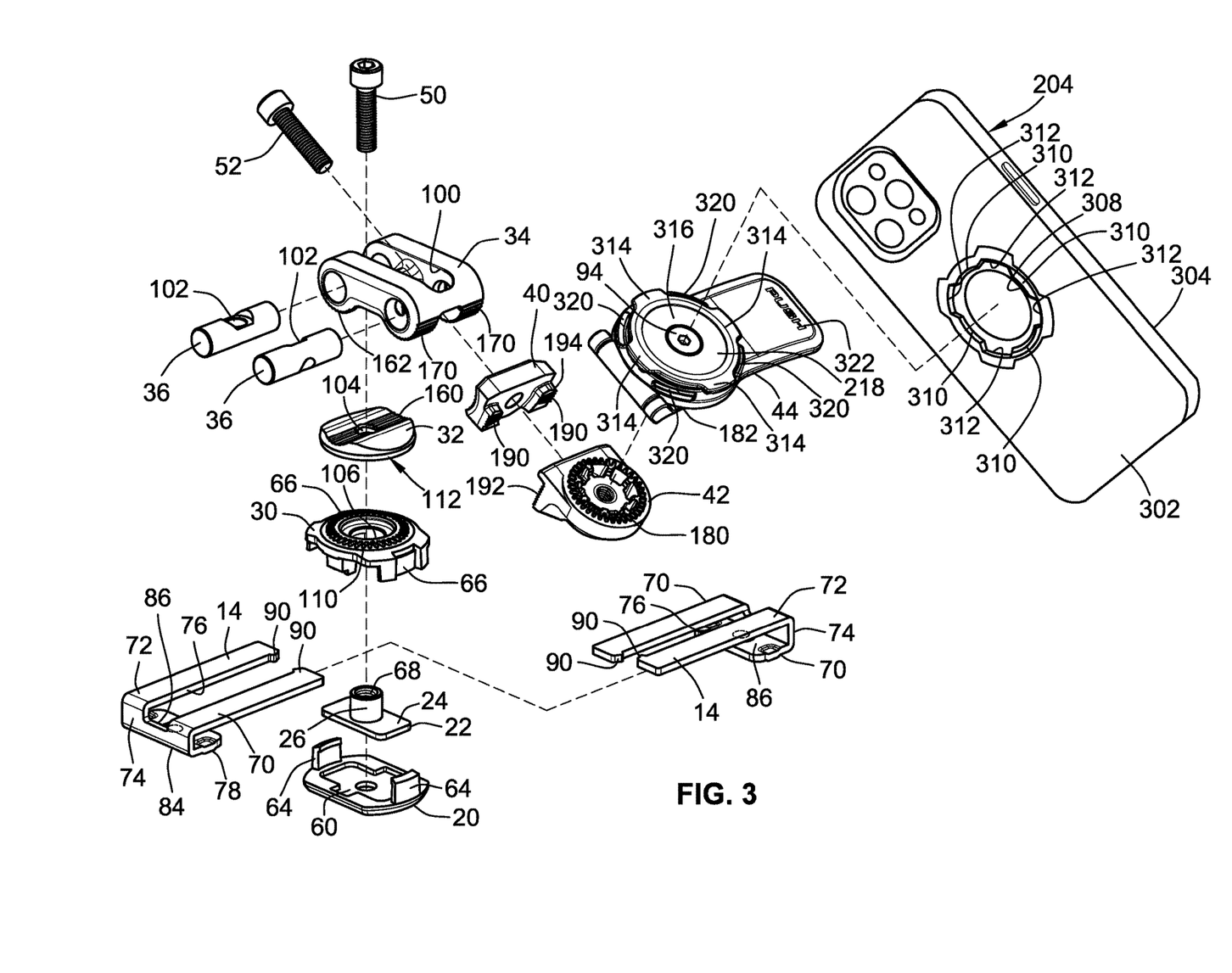
FIG. 3 is an exploded view of the mount of FIG. 1 and a handheld electronic device.
Figure 4:
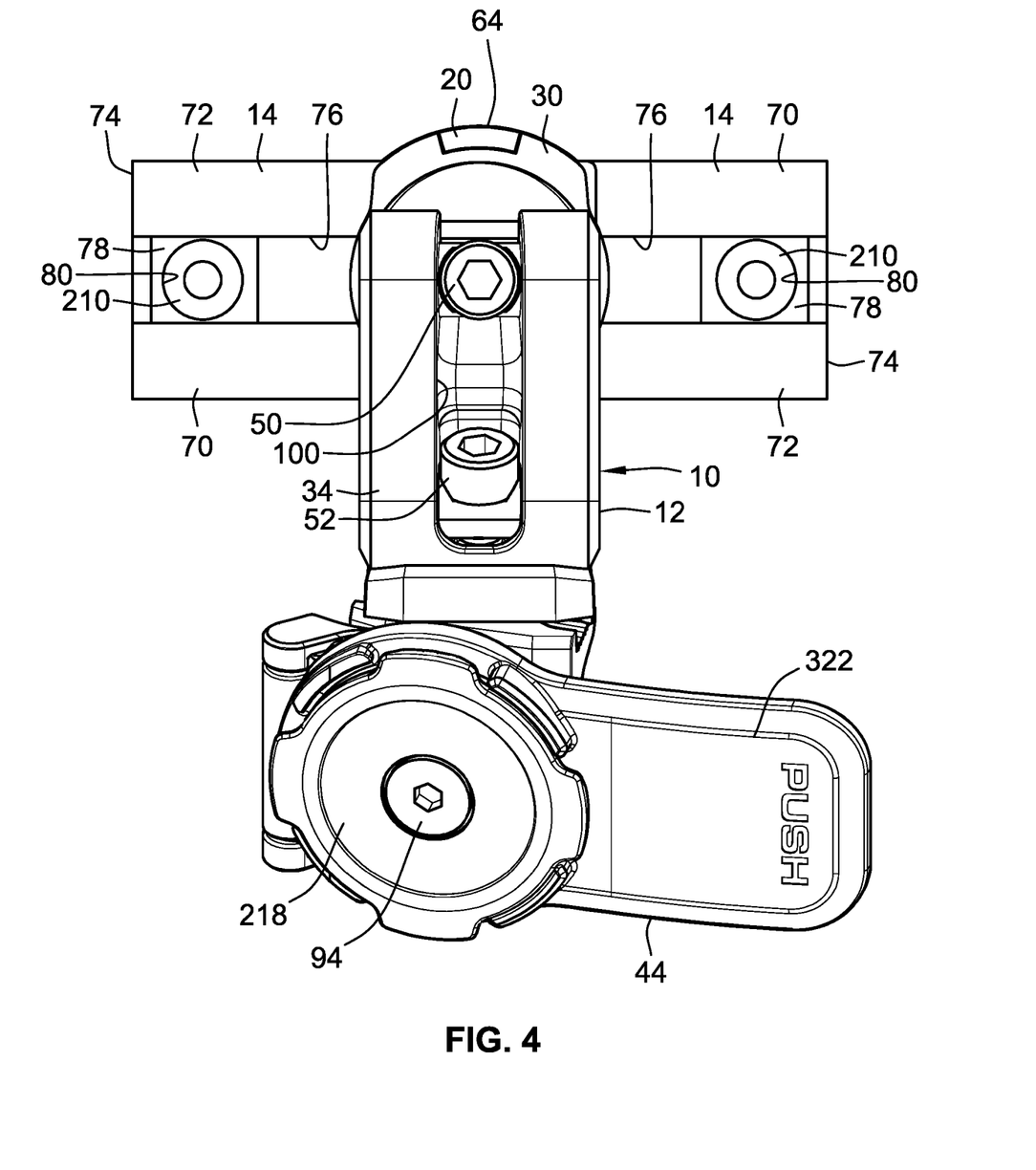
FIG. 4 is another perspective view of the mount of FIG. 1.
Figure 5:
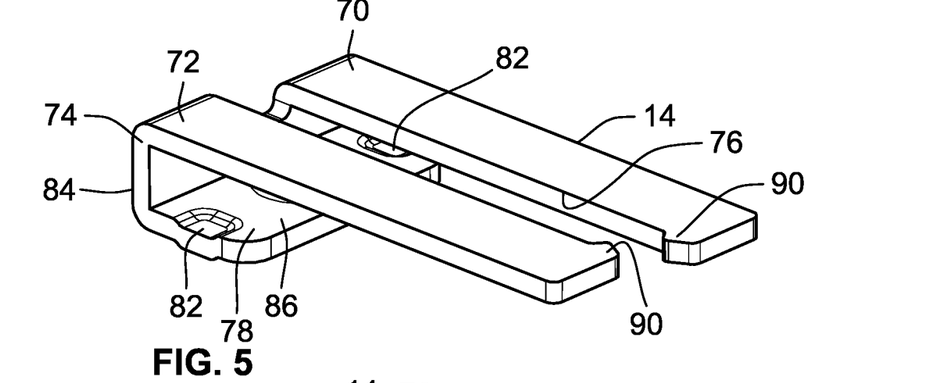
FIG. 5 is a perspective view of one of the brackets of the mount of FIG. 1.
Figure 6:
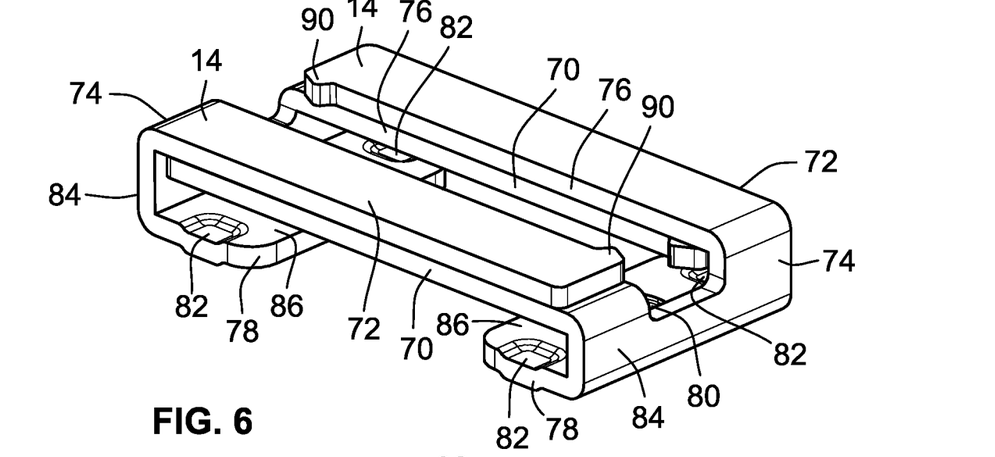
FIG. 6 is a perspective view of the brackets of the mount of FIG. 1 secured together to a fully contracted position.
Figure 7:
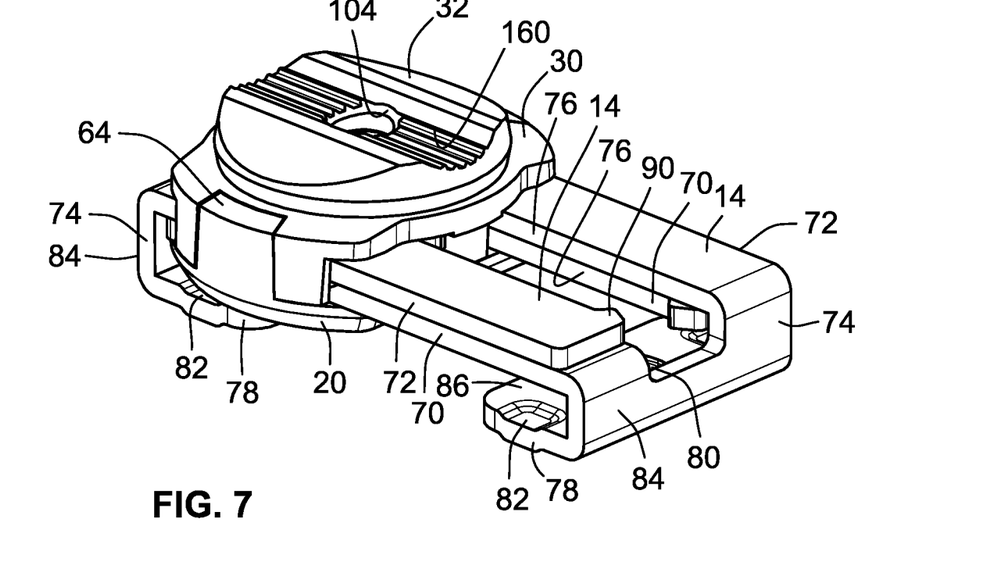
FIG. 7 is a perspective to the base cap, stud plate and cover engaged with the brackets of the mount of FIG. 1.
Figure 8:
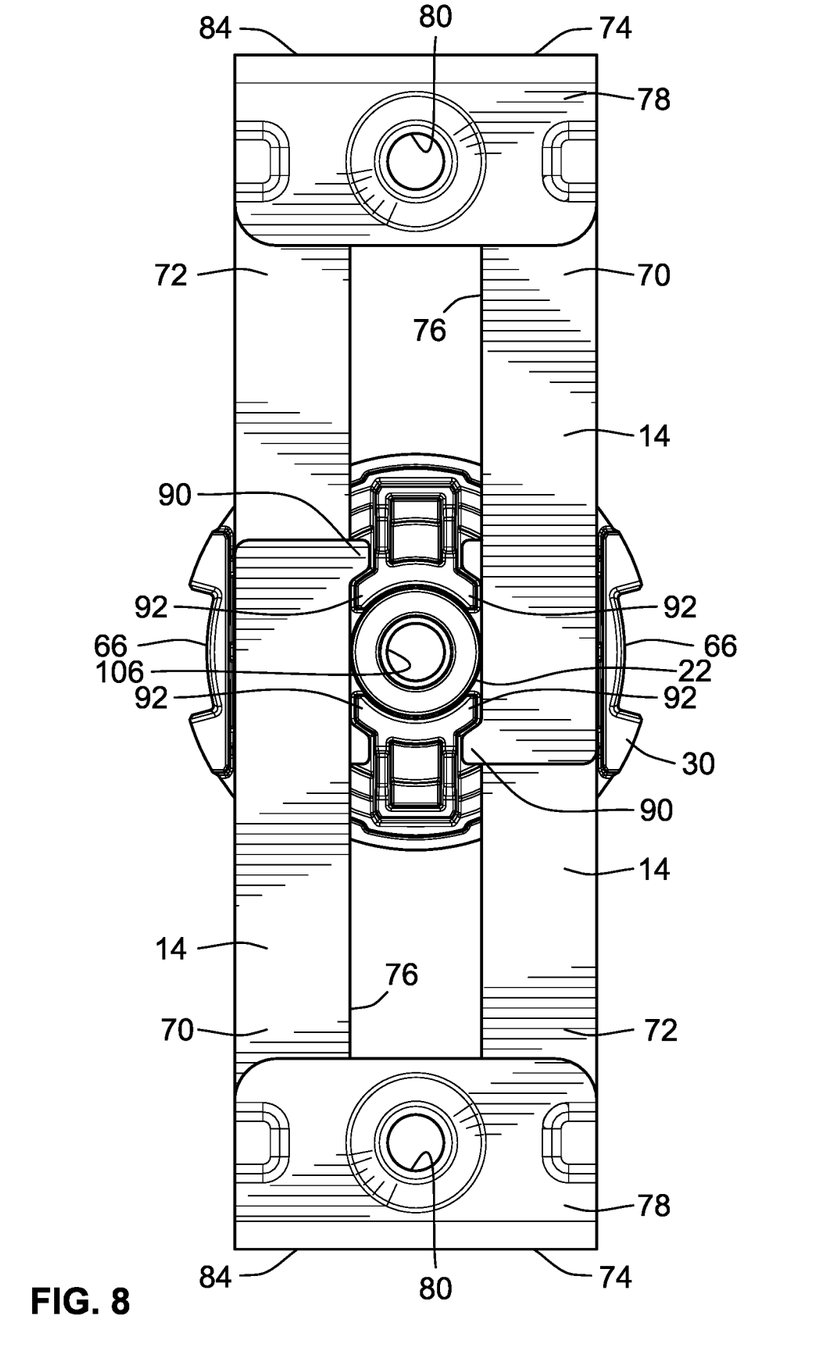
FIG. 8 is a bottom plan view of the cover of the mount body (with the base cap and stud plate removed) and the brackets of the mount of FIG. 1 engaged together with the brackets in an extended position.

A mount 10 in accordance with the present disclosure is illustrated in FIGS. 1-8. Mount 10 is configured for attachment to a brake reservoir assembly 200 of a vehicle, such as a motorcycle 202, for mounting a handheld electronic device 204, such as a smartphone, tablet, GPS unit, or monitor for example, on the motorcycle 202 and to permit adjustable positioning of the handheld electronic device relative to motorcycle 202. The brake reservoir assembly 200 includes a brake reservoir and may also include any structure that secures the brake reservoir 206 to the motorcycle 202, such as, for example, fasteners 210 and any other hardware such as mounting brackets. The motorcycle 202 includes a handlebar 216 and the brake reservoir assembly 200 is secured to the handlebar by fasteners 210.

In the illustrated embodiment, the mount 10 includes a mount body 12 and a pair of brackets 14 slidably engageable with each other for securing the mount body to the brake reservoir assembly 200. Mount body 12 includes a base cap 20; a stud plate 22 having a stud plate base 24 and column 26; a cover 30; a pivot spacer 32; a pivot arm 34; a pair of pivot pins 36 engaged with the pivot arm; a head spacer 40; a head 42; a handheld electronic device mount 44; a mount body fastener 50 for securing together the base cap 20, the stud plate 22, the cover 30, the pivot spacer 32, the pivot arm 34 and one of the pivot pins 36; and a mount body fastener 52 for securing together the pivot arm 34, the other of the pivot pins 36, the head spacer 40, the head 42 and the handheld electronic device mount 44. The base cap 20, stud plate 22 and cover 30 form a base of the mount body 12. All of these components may have the construction shown in FIGS. 1-8 or may have any other suitable construction in accordance with other embodiments of the present disclosure. Further one or more of these components can be eliminated in accordance with other embodiments of the present disclosure. In the illustrated embodiment, the fasteners 210 are existing components of the brake reservoir assembly 200 and the mount 10 is secured to the brake reservoir with those existing fasteners. In other embodiments, the fasteners 210 may be unique to the mount 10 or may otherwise be components of the mount.

In the illustrated embodiment, the base cap 20 defines a void 60 and includes a pair of latching arms 64. The stud plate base 24 is received by the void 60. The cover 30 includes a pair of latch tabs 66 for engaging the latching arms 64. The column 26 of the base plate 22 defines a threaded hole 68 that threadingly engages the mount body fasteners 50 and the cover 30 is positioned on top of the brackets 14. The column 26 extends from the bottom of the brackets 14. The base cap 20 and the stud plate 22 are positioned on a bottom of the brackets 14. The latching arms 64 extend around the brackets 14 to secure together the base cap 20, the stud plate 22 and the cover 30 to the brackets.

Each bracket 14 has a pair of arms 70 and 72 and a C-shaped end portion 74 at a distal end of the pair of arms. Each pair of arms 70 and 72 defines a slot 76 extending the length of the arms. The slots 76 of the arms 70 and 72 are contiguous when the brackets 14 are engaged and receive the column 26 of the stud plate 22. Each C-shaped end portion 74 includes a bottom tab 78 defining an aperture 80 for receiving a respective fastener 210 that extends through the slots 76 for securing a respective bracket 14 to the brake reservoir assembly 200. Each bottom tab 78 has a pair of swages 82 on opposite sides of the aperture 80 to provide outrigger support to prevent the mount 10 from rocking on curved surfaces.

Each C-shaped end portion 74 includes a side wall 84 and the side wall and the bottom tab 78 define an open face 86 and the open faces 86 of the brackets 14 face each other when the brackets 14 are engaged with each other. As a result, the brackets 24 may have a larger range of length adjustment as compared to prior art devices. Such structure provides clearance to allow the mount body 12 to slide along the brackets 14 when mounted to smaller brake reservoirs. This may be useful for compact mounting environments to position the mount body 12 away from surrounding motorcycle components such, for example, mirror stems and motorbike controls. With such structure, the fasteners 210 are also shielded by the brackets 14.

The arms 70 and 72 of each bracket 14 are parallel to each other but are offset relative to each other such that arm 72 is positioned higher from the bottom tab 78 than arm 74. Because the bracket arms 70 and 72 are offset, the brackets 14 are neither left-handed nor right-handed and can be installed from either side of the brake reservoir assembly 200. The brackets 14 are slidably engaged with each other such that the assembled brackets are adjustable in length to accommodate brake reservoir assemblies 200 of different sizes and structures. In one embodiment of the present disclosure, the brackets 14 can be adjustably positioned to have an assembled length anywhere between 38 mm and 70 mm during assembly.

Each of the arms 70 and 72 of each bracket 14 includes an inwardly-extending stop 90 at its end distal its respective C-shaped portion 74. A bottom of the cover 30 includes curved extensions terminating in stop tabs 92 that engage the stops 90 when the brackets 14 are completely extended to prevent the brackets 14 from separating when the brackets are being assembled to an extended mode.

Fastener 50 secures together the base cap 20, the brackets 14, the stud plate 22, the cover 30, the pivot spacer 32 and the pivot arm 34. The faster 50 extends through a void 100 defined by the pivot arm 34, a hole 102 defined by one of the pivot pins 36, a hole 104 defined by the pivot spacer; a hole 106 defined by the cover 32 and into the threaded hole 68 defined by the column 26 and threadingly engages the column 26 to secure these components together. These components may be assembled together in any other manner in accordance with other embodiments of the present disclosure.

The fastener 52 secures together the pivot arm 34, the head spacer 40, the head 42 and the electronic handheld device mount 44. The fastener 52 extends through the void 102 of the pivot arm 34, through a hole 104 defined by the head spacer 40 and a threaded bore 106 defined by the head 42 to secure these components together. The mount body 12 also includes a bolt 94 that secures together the components of the handheld electronic device mount 44. During assembly, the base cap 20, stud plate 22 and cover 30 are secured together and are slidable relative to the brackets 14 to permit adjustably position of the mount body 12 relative to the brackets. These components may be assembled together in any other manner in accordance with other embodiments of the present disclosure.

The cover 30 includes a plurality of circumferentially-spaced teeth 110 on its top side and the pivot spacer 32 includes a plurality of circumferentially-spaced teeth 112 on its bottom side that are rotably engaged with the teeth 110 to permit selective rotational positioning of the cover relative to the pivot spacer during assembly of the mount.

The pivot spacer 32 includes on its top side a plurality of teeth 160 and the pivot arm 34 includes a plurality of teeth 162 that engage with teeth 160 of the pivot spacer to permit selective pivoting positioning of the pivot arm 34 relate to the pivot spacer 32 during assembly of the mount.

The pivot arm 34 includes a plurality of teeth 170 and the head spacer 40 includes a plurality of teeth 172 that engage with the teeth 170 of the pivot arm to permit selective pivoting positioning of the pivot arm 34 relative to the head spacer during assembly of the mount 10.

Head 42 includes a plurality of circumferentially-spaced teeth 180 on an outer side and the handheld electronic device mount 44 includes a plurality of circumferentially-spaced teeth 182 on its bottom side that permit selective rotational positioning of the handheld electronic device mount 44 relative to the head during assembly of the mount 10.

In the illustrated embodiment, the head spacer 40 and the head 42 are fixedly secured to each other. The head spacer 40 and the head 42 have mating ledges 190 and 192 with mating teeth 194 and 196 to provide additional structure support to the mount 10. The head spacer 40 and the head spacer may be fixedly or adjustably secured together in any other manner in accordance with other embodiments of the present disclosure.

In an illustrated embodiment, the handheld electronic device mount has an interface 218 and the handheld electronic device mount 44 has a mounting interface 220 for securing together the head and the handheld electronic device mount 44 in a manner known in the art. In this regard, the case of the handheld electronic device 204 includes a rear wall 302 and a perimeter wall 304. A receiver 308 is formed in rear wall 302 and includes a series of case tabs 310 separated by gaps 312. A series of mount tabs 314 extend outward from attachment plate 316 of the mount head 42 for engagement with case tabs 310 to attach the handheld electronic device mount 204 with mount 10. Mount tabs 314 pass through gaps 312 and the handheld electronic device 204 is rotated relative to mount 10 to engage mount tabs 314 with case tabs 310. Lock tabs 320 on paddle 322 fall into gaps 312 and engage with case tabs 310 to block removal of handheld electronic device 204 from mount 10 at the selection of a user. The user may move paddle 322 relative to attachment plate 316 to pull lock tabs 320 out of gaps 312 and allow rotation and removal of handheld electronic device 204 from mount 10. The electronic handheld device 204 may be mounted to the head 42 to be adjustable relative to the head in any other suitable manner in accordance with other embodiments of the present disclosure. The case of the handheld electronic device 204 may also be coupled to the head 42 such that the case is not adjustable relative to the head in accordance with other embodiments of the present disclosure. Additionally, the case of the handheld electronic device 204 may be mounted directly to the head 42 or to any other structure coupled to the head in accordance with other embodiments of the present disclosure. The case of the handheld electronic device 204 may be a separable component of the handheld electronic device 204 or may be integral with the other components of the handheld electronic device.

Thus, the mount 10 in accordance with an illustrated embodiment of the present disclosure provides at least six different manners of adjusting the positioning of the handheld electronic device 204 relative to the brackets 14: (1) the mount body 12 is slidably and selectively positionable relative to the brackets 14; (2) the pivot spacer 32 is rotationally and selectively positionable relative to the cover 20; (3) the pivot arm 34 is pivotably and selectively positionable relative to the pivot spacer 32; (4) the pivot arm 34 is pivotably and selectively positionable relative to the head spacer 40; (5) the head 42 is rotationally and selectively positionable relative to the handheld electronic device mount 44; and (6) the handheld electronic device 204 is rotationally and selectively positionable relative to handheld electronic device mount 44. Each of these manners of adjustment may be eliminated or modified in accordance with other embodiments of the present disclosure. Additionally, the components of the mount 10 that permit such adjustability may be modified to achieve similar or different types of adjustability in accordance with other embodiments of the present disclosure.

Some non-limiting examples of the above-described embodiments can include the following:

1. A mount for coupling a handheld electronic device to a brake reservoir assembly of a motorcycle, the mount comprising:
   a mount body securable to the handheld electronic device, the mount body including a pivot arm pivotable in at least one direction for adjusting the positioning of the handheld electronic device; and
   a pair of brackets slidably engageable with the mount body and slidably engageable with each other during assembly of the mount, the brackets securable to the brake reservoir assembly by a pair of fasteners, each bracket having a pair of arms extending parallel to each other and a C-shaped end portion, each pair of arms defining a slot for receivably engaging the mount body, each C-shaped end portion including a bottom tab defining an aperture for receiving a respective fastener extending through a respective slot for securing a respective bracket to the brake reservoir assembly, each C-shaped end portion defining an open face, the open faces facing each other when the brackets are engaged with each other.

2. The mount of claim 1 wherein one arm of each bracket is offset relative to the other arm of the bracket, one arm of one bracket disposed on a top side of one arm of the other bracket and the other arm of the one bracket disposed on a bottom side of the other arm of the other bracket when the brackets are engaged with each other.

3. The mount of claim 1 wherein the mount body includes a mount body fastener and a base for securing the mount body to the brackets, the base having a base cap, a stud plate having a column defining a column hole, and a cover defining a cover hole, the base cap and stud plate disposed on a bottom side of the pair of brackets and the cover disposed on a top side of the pair of brackets when the brackets are engaged with each other, the column extending through the slots defined by the pairs of arms and into the cover hole, the mount body fastener extending through the cover hole and into the column hole for securing the mount body to the pair of brackets.

4. The mount of claim 3 wherein the mount body fastener is coupled to the pivot arm and secures the pivot arm to the brackets.

5. The mount of claim 3 wherein the base cap includes a pair of latching arms and the cover includes a pair of latch tabs engaged with the latching arms, the latching arms extending around the pair of brackets.

6. The mount of claim 3 wherein the brackets have a length when engaged, the length being adjustable between an extended length to a collapsed length and wherein each arm of each bracket includes a stop at an end distal from the C-shaped portion of the arm and the cover includes a plurality of stop tabs, the stops engaging the stop tabs when the brackets are extended to the expanded size to prevent the brackets from separating from each other during engagement of the brackets and mount body.

7. The mount of claim 3 wherein the mount body further includes a handheld electronic device mount having an interface securable to the handheld electronic device.

8. The mount of claim 7 wherein the mount body further includes a pair of pivot pins associated with the pivot arm.

9. The mount of claim 7 wherein the mount body further includes a pivot spacer engaged with the pivot arm and a top side of the cover, the pivot spacer defining a pivot spacer hole for receiving the mount body fastener, the pivot spacer including a first plurality of teeth and the cover including a second plurality of teeth engageable and selectively positionable with the first plurality of teeth to permit selective rotational positioning of the pivot spacer relative to the cover during adjustment of the mount.

10. The mount of claim 9 wherein the first plurality of teeth are circumferentially-spaced on a bottom of the pivot spacer and the second plurality of teeth are circumferentially-spaced on a top of the cover.

11. The mount of claim 7 wherein the mount body further includes a pivot spacer engaged with the pivot arm, the pivot arm including a first plurality of teeth and the pivot spacer including a second plurality teeth engageable and selectively positionable with the first plurality of teeth to permit selective pivotal positioning of the pivot arm relative to the pivot spacer during adjustment of the mount.

12. The mount of claim 7 wherein the mount body includes a head spacer engaged with the pivot arm, and a head engaged with the head spacer and the handheld electronic device mount, the pivot arm includes a first plurality of teeth and the pivot spacer includes a second plurality of teeth engageable and selectively positionable with the first plurality of teeth to permit and selective pivotal positioning of the pivot arm relative to the head spacer during adjustment of the mount.

13. The mount of claim 7 wherein the mount body includes a head coupled to the pivot arm and engaged with the handheld electronic device mount, the head includes a first plurality of teeth and the handheld electronic device mount includes a second plurality of teeth engageable and selectively positionable with the first plurality of teeth to permit selective rotational positioning of the head relative to the handheld electronic device mount during adjustment of the mount.

14. The mount of claim 13 wherein the first plurality of teeth are circumferentially-spaced and the second plurality of teeth are circumferentially-spaced.

15. The mount of claim 7 wherein the brackets have a length when engaged, the length being adjustable from an extended length to a collapsed length.

16. The mount of claim 15 wherein each arm of each bracket includes a stop at an end of the arm distal from the C-shaped portion of the arm, the stops engaging the base when the brackets are extended to the expanded size to prevent the brackets from separating from each other during engagement of the brackets and mount body.

17. The mount of claim 1 wherein the mount body includes a base for securing the mount body to the brackets, the base being slidable relative to the brackets during securement of the mount body to the brackets to permit selective positioning of the mount body relative to the brackets during engagement of the brackets and mount body.

18. The mount of claim 1 wherein each bottom tab includes a pair of swages disposed about a respective aperture to assist in stabilization of the brackets relative to the brake reservoir when the mount is coupled to the brake reservoir.

19. A mount for coupling a handheld electronic device to a brake reservoir assembly of a motorcycle, the mount comprising:

a mount body securable to the handheld electronic device, the mount body including a pivot arm pivotable in at least one direction for adjusting the positioning of the handheld electronic device, the mount body further includes a pair of pivot pins associated with the pivot arm and a handheld electronic device mount having an interface securable to the handheld electronic device; and a pair of brackets slidably engageable with the mount body and slidably engageable with each other during assembly of the mount, the brackets securable to the brake reservoir assembly by a pair of fasteners, each bracket having a pair of arms extending parallel to each other and an end portion, each pair of arms defining a slot for receivably engaging the mount body, each end portion including a bottom tab defining an aperture for receiving a respective fastener extending through a respective slot for securing a respective bracket to the brake reservoir assembly;

wherein the mount body further includes a base for securing the mount body to the brackets and a pivot spacer engaged with the pivot arm and the base, the pivot spacer including a first plurality of teeth and the cover including a second plurality of teeth engageable and selectively positionable with the first plurality of teeth to permit selective rotational positioning of the pivot spacer relative to the base during adjustment of the mount.

wherein the pivot arm includes a third plurality of teeth and the pivot spacer includes a fourth plurality teeth engageable and selectively positionable with the third plurality of teeth to permit selective pivotal positioning of the pivot arm relative to the pivot spacer during adjustment of the mount.

wherein the mount body includes a head spacer engaged with the pivot arm and a head engaged with the head spacer and the handheld electronic device mount, the pivot arm includes a fifth plurality of teeth and the pivot spacer includes a sixth plurality of teeth engageable and selectively positionable with the fifth plurality of teeth to permit and selective pivotal positioning of the pivot arm relative to the head spacer during adjustment of the mount;

wherein the head includes a seventh plurality of teeth and the handheld electronic device mount includes an eighth plurality of teeth engageable and selectively positionable with the seventh plurality of teeth to permit selective rotational positioning of the head relative to the handheld electronic device mount during adjustment of the mount.

20. The mount of claim 19 wherein the first plurality of teeth are circumferentially-spaced on a bottom of the pivot spacer and the second plurality of teeth are circumferentially-spaced on a top of the cover, the first plurality of teeth are circumferentially-spaced and the second plurality of teeth are circumferentially-spaced.

As used in the foregoing description, the terms "top" and "bottom" simply refer to the orientation of the illustrated structure and are not intended to be limiting to the scope of the disclosure.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims.

The invention claimed is:

1. A mount for coupling a handheld electronic device to a brake reservoir assembly of a motorcycle, the mount comprising:
    a mount body securable to the handheld electronic device, the mount body including a pivot arm pivotable in at least one direction for adjusting the positioning of the handheld electronic device; and
    a pair of brackets slidably engageable with the mount body and slidably engageable with each other during assembly of the mount, the brackets securable to the brake reservoir assembly by a pair of fasteners, each bracket having a pair of arms extending parallel to each other and a C-shaped end portion, each pair of arms defining a slot for receivably engaging the mount body, each C-shaped end portion including a bottom tab defining an aperture for receiving a respective fastener extending through a respective slot for securing a respective bracket to the brake reservoir assembly, each C-shaped end portion defining an open face, the open faces facing each other when the brackets are engaged with each other.

2. The mount of claim 1 wherein one arm of each bracket is offset relative to the other arm of the bracket, one arm of one bracket disposed on a top side of one arm of the other bracket and the other arm of the one bracket disposed on a bottom side of the other arm of the other bracket when the brackets are engaged with each other.

3. The mount of claim 1 wherein the mount body includes a mount body fastener and a base for securing the mount body to the brackets, the base having a base cap, a stud plate having a column defining a column hole, and a cover defining a cover hole, the base cap and stud plate disposed on a bottom side of the pair of brackets and the cover disposed on a top side of the pair of brackets when the brackets are engaged with each other, the column extending through the slots defined by the pairs of arms and into the cover hole, the mount body fastener extending through the cover hole and into the column hole for securing the mount body to the pair of brackets.

4. The mount of claim 3 wherein the mount body fastener is coupled to the pivot arm and secures the pivot arm to the brackets.

5. The mount of claim 3 wherein the base cap includes a pair of latching arms and the cover includes a pair of latch tabs engaged with the latching arms, the latching arms extending around the pair of brackets.

6. The mount of claim 3 wherein the brackets have a length when engaged, the length being adjustable between an extended length to a collapsed length and wherein each arm of each bracket includes a stop at an end distal from the C-shaped portion of the arm and the cover includes a plurality of stop tabs, the stops engaging the stop tabs when the brackets are extended to the expanded size to prevent the brackets from separating from each other during engagement of the brackets and mount body.

7. The mount of claim 3 wherein the mount body further includes a handheld electronic device mount having an interface securable to the handheld electronic device.

8. The mount of claim 7 wherein the mount body further includes a pair of pivot pins associated with the pivot arm.

9. The mount of claim 7 wherein the mount body further includes a pivot spacer engaged with the pivot arm and a top side of the cover, the pivot spacer defining a pivot spacer hole for receiving the mount body fastener, the pivot spacer including a first plurality of teeth and the cover including a second plurality of teeth engageable and selectively positionable with the first plurality of teeth to permit selective rotational positioning of the pivot spacer relative to the cover during adjustment of the mount.

10. The mount of claim 9 wherein the first plurality of teeth are circumferentially-spaced on a bottom of the pivot spacer and the second plurality of teeth are circumferentially-spaced on a top of the cover.

11. The mount of claim 7 wherein the mount body further includes a pivot spacer engaged with the pivot arm, the pivot arm including a first plurality of teeth and the pivot spacer including a second plurality teeth engageable and selectively positionable with the first plurality of teeth to permit selective pivotal positioning of the pivot arm relative to the pivot spacer during adjustment of the mount.

12. The mount of claim 7 wherein the mount body includes a head spacer engaged with the pivot arm, and a head engaged with the head spacer and the handheld electronic device mount, the pivot arm includes a first plurality of teeth and the pivot spacer includes a second plurality of teeth engageable and selectively positionable with the first plurality of teeth to permit and selective pivotal positioning of the pivot arm relative to the head spacer during adjustment of the mount.

13. The mount of claim 7 wherein the mount body includes a head coupled to the pivot arm and engaged with the handheld electronic device mount, the head includes a first plurality of teeth and the handheld electronic device mount includes a second plurality of teeth engageable and selectively positionable with the first plurality of teeth to permit selective rotational positioning of the head relative to the handheld electronic device mount during adjustment of the mount.

14. The mount of claim 13 wherein the first plurality of teeth are circumferentially-spaced and the second plurality of teeth are circumferentially-spaced.

15. The mount of claim 7 wherein the brackets have a length when engaged, the length being adjustable from an extended length to a collapsed length.

16. The mount of claim 15 wherein each arm of each bracket includes a stop at an end of the arm distal from the C-shaped portion of the arm, the stops engaging the base when the brackets are extended to the expanded size to prevent the brackets from separating from each other during engagement of the brackets and mount body.

17. The mount of claim 1 wherein the mount body includes a base for securing the mount body to the brackets, the base being slidable relative to the brackets during securement of the mount body to the brackets to permit selective positioning of the mount body relative to the brackets during engagement of the brackets and mount body.

18. The mount of claim 1 wherein each bottom tab includes a pair of swages disposed about a respective aperture to assist in stabilization of the brackets relative to the brake reservoir when the mount is coupled to the brake reservoir.

19. A mount for coupling a handheld electronic device to a brake reservoir assembly of a motorcycle, the mount comprising:
    a mount body securable to the handheld electronic device, the mount body including a pivot arm pivotable in at least one direction for adjusting the positioning of the handheld electronic device, the mount body further includes a pair of pivot pins associated with the pivot arm and a handheld electronic device mount having an interface securable to the handheld electronic device; and a pair of brackets slidably engageable with the mount body and slidably engageable with each other during assembly of the mount, the brackets securable to the brake reservoir assembly by a pair of fasteners, each bracket having a pair of arms extending parallel to each other and an end portion, each pair of arms defining a slot for receivably engaging the mount body, each end portion including a bottom tab defining an aperture for receiving a respective fastener extending through a respective slot for securing a respective bracket to the brake reservoir assembly;

wherein the mount body further includes a base for securing the mount body to the brackets and a pivot spacer engaged with the pivot arm and the base, the pivot spacer including a first plurality of teeth and the base including a second plurality of teeth engageable and selectively positionable with the first plurality of teeth to permit selective rotational positioning of the pivot spacer relative to the base during adjustment of the mount;

wherein the pivot arm includes a third plurality of teeth and the pivot spacer includes a fourth plurality teeth engageable and selectively positionable with the third plurality of teeth to permit selective pivotal positioning of the pivot arm relative to the pivot spacer during adjustment of the mount;

wherein the mount body includes a head spacer engaged with the pivot arm and a head engaged with the head spacer and the handheld electronic device mount, the pivot arm includes a fifth plurality of teeth and the pivot spacer includes a sixth plurality of teeth engageable and selectively positionable with the fifth plurality of teeth to permit and selective pivotal positioning of the pivot arm relative to the head spacer during adjustment of the mount;

wherein the head includes a seventh plurality of teeth and the handheld electronic device mount includes an eighth plurality of teeth engageable and selectively positionable with the seventh plurality of teeth to permit selective rotational positioning of the head relative to the handheld electronic device mount during adjustment of the mount.

20. The mount of claim 19 wherein the first plurality of teeth are circumferentially-spaced on a bottom of the pivot spacer and the second plurality of teeth are circumferentially-spaced on a top of the base, the first plurality of teeth are circumferentially-spaced and the second plurality of teeth are circumferentially-spaced.

* * * * *